United States Patent [19]
Furuie et al.

[11] Patent Number: 5,410,114
[45] Date of Patent: Apr. 25, 1995

[54] STEERING WHEEL HORN SWITCH MECHANISM

[75] Inventors: Tsuneichi Furuie; Ichizo Shiga; Koji Sakurai, all of Aichi; Hiroaki Kuno, Shizuoka, all of Japan

[73] Assignee: Toyoda Gosei Co., Ltd., Nishikasugai, Japan

[21] Appl. No.: 166,629

[22] Filed: Dec. 15, 1993

[30] Foreign Application Priority Data

Dec. 25, 1992 [JP] Japan .................................. 4-347117
Dec. 25, 1992 [JP] Japan .................................. 4-347135

[51] Int. Cl.⁶ ...................... H01H 9/00; B60R 21/00; B62D 1/04
[52] U.S. Cl. .................................................. 200/61.55
[58] Field of Search ............... 200/61.54, 61.55, 61.56, 200/61.57; 280/731; B62D 1/04

[56] References Cited
U.S. PATENT DOCUMENTS

| | | | |
|---|---|---|---|
| 4,785,144 | 11/1988 | Fosnaugh et al. | 200/61.55 |
| 4,789,763 | 12/1988 | Nagata et al. | 200/61.54 |
| 4,808,776 | 2/1989 | Niwa et al. | 200/61.55 |
| 4,963,704 | 10/1990 | Buma et al. | 200/61.55 |
| 5,024,464 | 6/1991 | Kawaguchi et al. | 280/731 |
| 5,235,146 | 8/1993 | Suzuki | 200/61.54 |
| 5,239,147 | 8/1993 | Allard et al. | 200/61.54 |

FOREIGN PATENT DOCUMENTS 3710173 2/1990 Germany .
2-38275 3/1990 Japan .

Primary Examiner—J. R. Scott
Attorney, Agent, or Firm—Cushman, Darby & Cushman

[57] ABSTRACT

A steering wheel is provided having a vibration prevention mechanism and a horn switch mechanism, the horn switch mechanism includes: first and second contact plates each having two contacts for operating a horn; coil springs provided between the first and second contact plates to space them away from each other; and guide pins for guiding the movement of the contact plates towards each other. The vibration prevention mechanism includes a mounting plate; two vibration proofing rubber members provided between the mounting plate and the second contact plate to couple the mounting place to the second contact plate. The two contacts of the first contact plates, the two contacts of the second contact plates, and the two vibration proofing members are located in one and the same plane. This arrangement allows the operator to operate the horn smoothly.

13 Claims, 8 Drawing Sheets

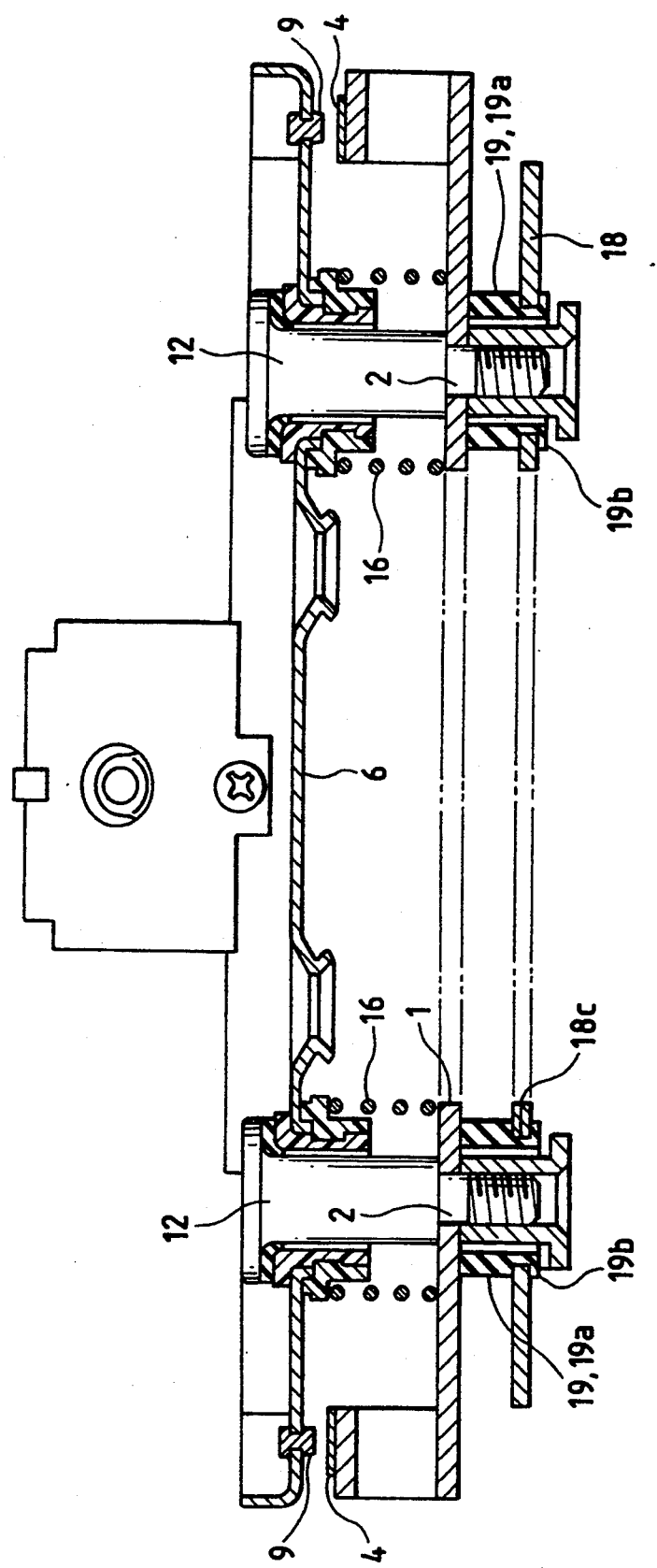

STEERING WHEEL HORN SWITCH MECHANISM

BACKGROUND OF THE INVENTION

This invention relates automobiles, and more particularly, to a steering wheel in an automobile which has a vibration prevention mechanism, and a horn switch mechanism.

A steering wheel having a vibration prevention mechanism and a horn switch mechanism has been proposed by Japanese Utility Patent Application (OPI) No. 3827.5/1990 (the term "OPI" as used herein means an "unexamined application"). The vibration prevention mechanism prevents the ring section of the steering wheel from being vibrated by the oscillation of the engine which is transmitted through the steering shaft.

In the above-described steering wheel, the horn switch mechanism comprises: first and second plates having contacts which are brought into contact with each other to operate the horn; coil springs interposed between the first and second contact plates to space them away from each other; and guide pins inserted into the first and second contact plates, to guide the movement of the second contact plate towards the first contact plate.

In the vibration prevention mechanism, annular vibration proofing rubber members are engaged with the cylindrical walls of guide pin inserting holes formed in the second contact plate, and the coil springs of the horn switch mechanism are provided between the first contact plate and the vibration proofing rubber members.

The above-described conventional steering wheel has the following disadvantages. In order to operate the horn switch mechanism, it is necessary to push the second contact plate towards the first contact plate against the elastic forces of the coil springs. In this operation, the pushing motion is abruptly stopped when the contacts of the first plate are brought into contact with the contacts of the second contact plate; that is, since the horn is not smoothly operable, the operator may not experience a comfortable response when pushing the contact plate.

SUMMARY OF THE INVENTION

According, an object of this invention is to eliminate the above-described difficulty accompanying a conventional steering wheel having a vibration prevention mechanism and a horn switch mechanism.

More specifically, an object of the invention is to provide a steering wheel having a vibration prevention mechanism and a horn switch mechanism, in which the vibration prevention mechanism is effectively utilized to allow the operator to operate the horn smoothly.

The foregoing object and other objects of the invention have been achieved by providing:

A steering wheel including a vibration prevention mechanism, and a horn switch mechanism, in which, according to a first aspect of the invention, the horn switch mechanism comprises: first and second contact plates each having two contacts for operating a horn; energizing means provided between the first and second contact plates to space them away from each other; and guide pins inserted into the first and second contact plates, for guiding the movement of those contact plates towards each other, and the vibration prevention mechanism comprises: a mounting plate set at a predetermined position; two vibration proofing rubber members provided between the mounting plate and the second contact plate, to couple the mounting plate to the second contact plate, the two contacts of the first contact plates, the two contacts of the second contact plates, and the two vibration proofing members being in one and the same plane.

In accordance with a second aspect of the invention, a steering wheel is provided comprising a vibration prevention mechanism and a horn switch, in which, the horn switch mechanism comprises: first and second contact plates each having two contacts for operating a horn; energizing means provided between the first and second contact plates to space them away from each other; and guide pins inserted into the first and second contact plates, for guiding the movement of those contact plates towards each other, and the vibration prevention mechanism comprises: a mounting plate having insertion holes, into which the guide pins are inserted, the mounting plate being set at a predetermined position; and vibration proofing rubber members each including a body provided between the mounting plate and the second contact plate to couple the mounting plate to the second contact plate, and a cover portion extended from the body to cover the cylindrical wall of the insertion hole of the mounting plate, each of the guide pins having flanges at both ends to regulate the distance between the second contact plate and the mounting plate.

In accordance with a third aspect of the invention a steering wheel is provided which comprises:

a steering wheel body including a ring section, a boss section, and spoke sections coupling the ring section to the boss section;

a horn pad provided over the boss section; and a horn switch mechanism provided between the steering wheel body and the horn pad;

the horn switch mechanism comprising:

a first contact plate with contacts;

a second contact plate secured to one of the steering wheel body and the horn pad, the second contact plate having contacts which are brought into contact with the contacts of the first contact plate;

a mounting plate having insertion holes secured to the other one of the steering wheel body and the horn pad;

vibration proofing rubber members through which the mounting plate is coupled to the first contact plates;

elastic members adapted to space the first and second contact plates away from each other;

guides adapted to guide the movement of at least one of the first and second contact plates, being loosely inserted into the insertion holes of the mounting plate, each of the guides having a flange at each end for regulating the distance between the second contact plate and the mounting plate.

In accordance with a fourth aspect of the invention a steering wheel is provided which comprises:

a steering wheel body including a ring section, a boss section, and spoke sections coupling the ring section to the boss section;

a horn pad provided over the boss section; and a horn switch mechanism provided between the steering wheel body and the horn pad;

the horn switch mechanism comprising:

a first contact plate having a plurality of first contacts;

a second contact plate secured to one of the steering wheel body and the horn pad, the second contact plate having a plurality of second contacts which are brought into contact with the first contacts of the first contact plate;

a mounting plate secured to the other one of the steering wheel body and the horn pad;

a plurality of vibration proofing rubber members provided with respect to the first contacts, through which the mounting plate is coupled to the first contact plate;

elastic members adapted to space the first and second plates away from each other;

the plurality of first contacts, the plurality of second contacts, and the plurality of vibration proofing rubber members being arranged in a plurality of phantom planes which are in parallel with one another, in such a manner that each phantom plane includes each first contact, each second contact, and each vibration proofing rubber member.

With the steering wheel of the invention, the horn is operated as follows: When the first and second contact plates are moved towards each other against the energizing forces of the energizing means, the contacts of the contact plates are brought into contact with each other while the contact plates are being guided by the guide pins.

When one of the two contact plates is pushed towards the other, the vibration proofing rubber members are elastically deformed, and the two contact plates are moved together, which prevents the pushing motion from being stopped abruptly.

The nature, utility and principle of the invention will be more clearly understood from the following detailed description and the appended claims when read in conjunction with the accompanying drawings.

BRIEF DESCRIPTION OF THE DRAWINGS

FIGS. 7 and 8 are sectional views showing modifications of the steering wheel.

DETAILED DESCRIPTION OF THE INVENTION

A steering wheel, which constitutes a first embodiment of this invention, will be described with reference to FIG. 1.

Figure 1:
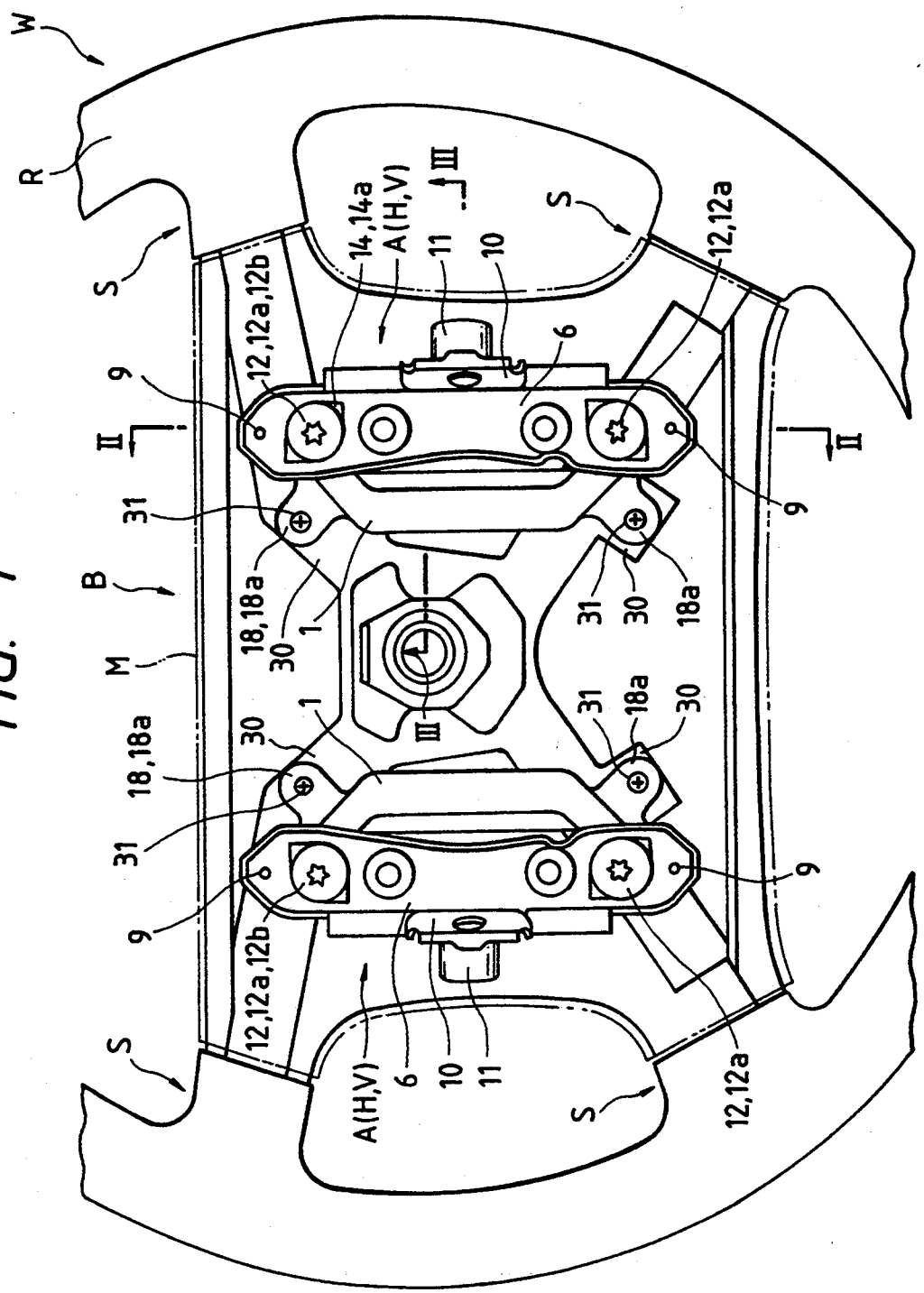
FIG. 1 is a plan view of a steering wheel, which constitutes a first embodiment of this invention.

As shown in FIG. 1, the steering wheel W of the invention includes an annular ring section R; a boss section B located at the center of the ring section R; and four spoke sections S through which the boss section B is coupled to the ring section R. An air bag device M is provided above the boss section B. A horn switch mechanism H and a vibration prevention mechanism V are provided on each of the right and left side of the boss section B below the air bag device M. Hereinafter, only the mechanisms H and V on the right side will be described because they are symmetrical with those on the left side.

In the embodiment, the horn switch mechanism H, as shown in FIGS. 1 through 6, comprises: a first contact plate 1 provided on the stationary side; a second contact plate 6 provided on the movable side; energizing means, namely, coil springs 16 for spacing the second contact plate 6 away from the first contact plate 1; and two guide pins 12 for guiding the second contact plate 6 toward the first contact plate 1.

The first contact plate is a metal plate, being substantially shallow-U-shaped in planar configuration. Both end portions of the first contact plate 1 are bent upwardly and then horizontally, thus forming bent portions 3 and 3 substantially U-shaped in section. Contacts 4 and 4 are formed on the upper surfaces of the bent portions 3 and 3, respectively. The first contact plate 1 has two insertion holes 2 and 2 between the bent portions 3 and 3, into which the guide pins 12 and 12 are inserted, respectively.

Figure 2:
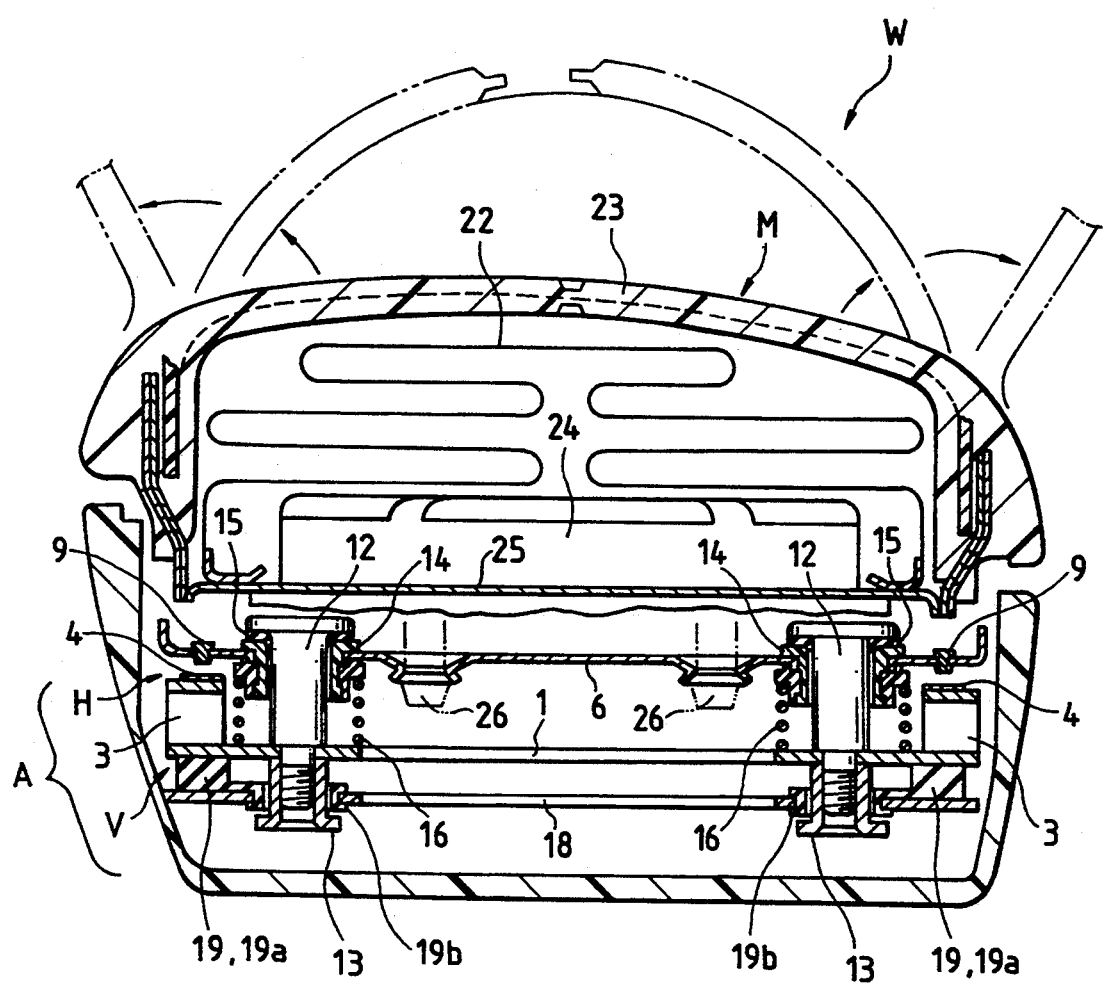
FIG. 2 is a sectional view taken along line II—II in FIG. 1.

The second contact plate 6, a metal plate, is substantially I-shaped in planar configuration, having a reinforcing rib (with no reference number) along the edge. The second contact plate 6 has contacts 9 and 9 at both ends, which are to be brought into contact with the contacts 4 and 4 of the first contact plate 1. The second contact plate 6 further includes insertion holes 7 and 7 (FIG. 4) between the contacts 4 and 4, into which the guide pins 12 and 12 are inserted, and locking holes 8 and 8 between the insertion holes 7 and 7 with which the locking legs 26 of the air bag device M are temporarily engaged (FIG. 2).

Figure 3:
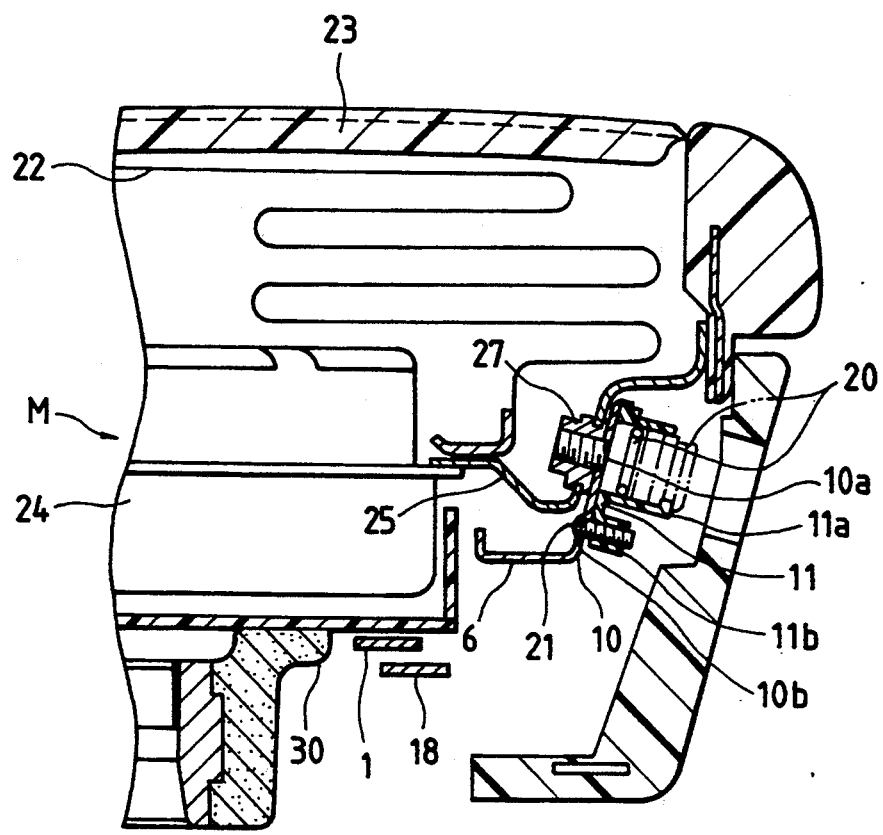
FIG. 3 is a sectional view taken along line III—III in FIG. 1.

The second contact plate 6 has a mounting piece 10 which is extended obliquely upward from its one side. The mounting piece 10 is to fixedly secured the air bag device M. More specifically, as shown in FIG. 3, the mounting piece 10 has two mounting holes 10a and 10b. The mounting hole 10a is to receive a bolt 20 for securing the air bag device M, and the mounting hole 10b is to receive a screw 21 for securing an attachment 11. The attachment 11 is to temporarily secure the bolt 20 to the mounting piece 10, and has a locking cylinder 11a for temporarily holding a bolt 20, and a threaded hole 11b which is engaged with the screw 21.

Figure 4:
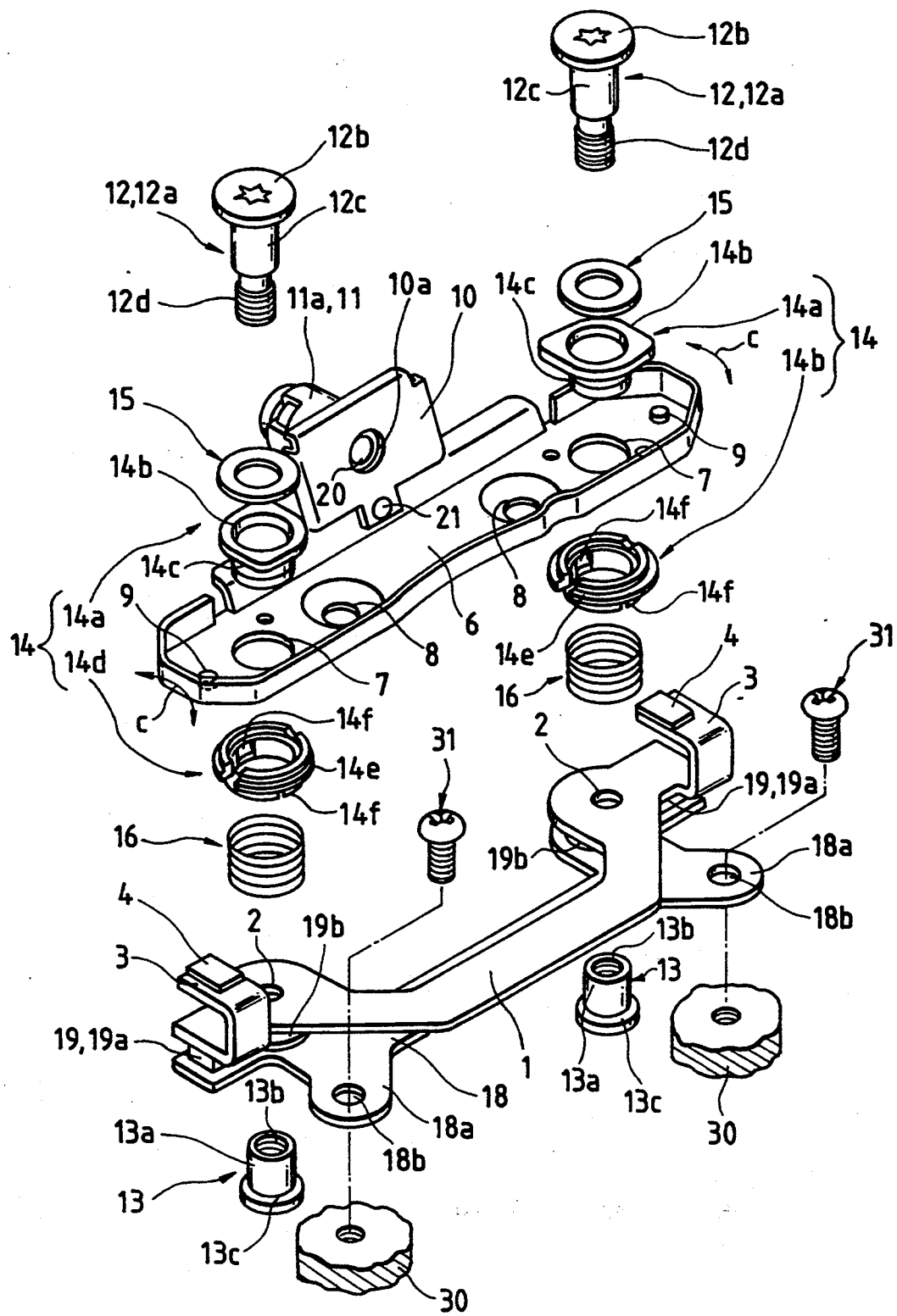
FIG. 4 is an exploded view of a horn switch mechanism and a vibration prevention mechanism in the first embodiment.
Figure 5:
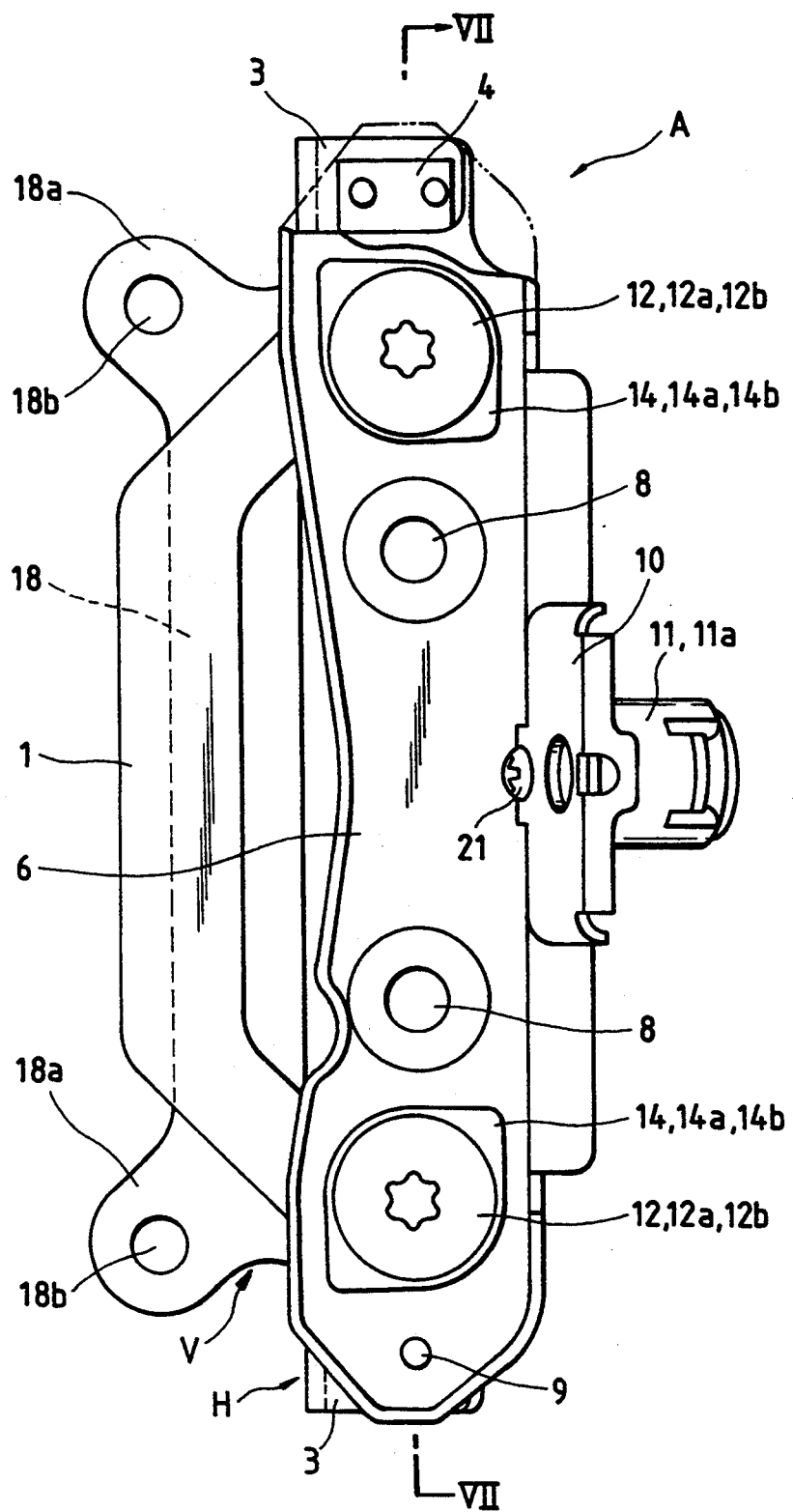
FIG. 5 is a plan view showing the assembly of the horn switch mechanism and the vibration prevention mechanism in the first embodiment.
Figure 6:
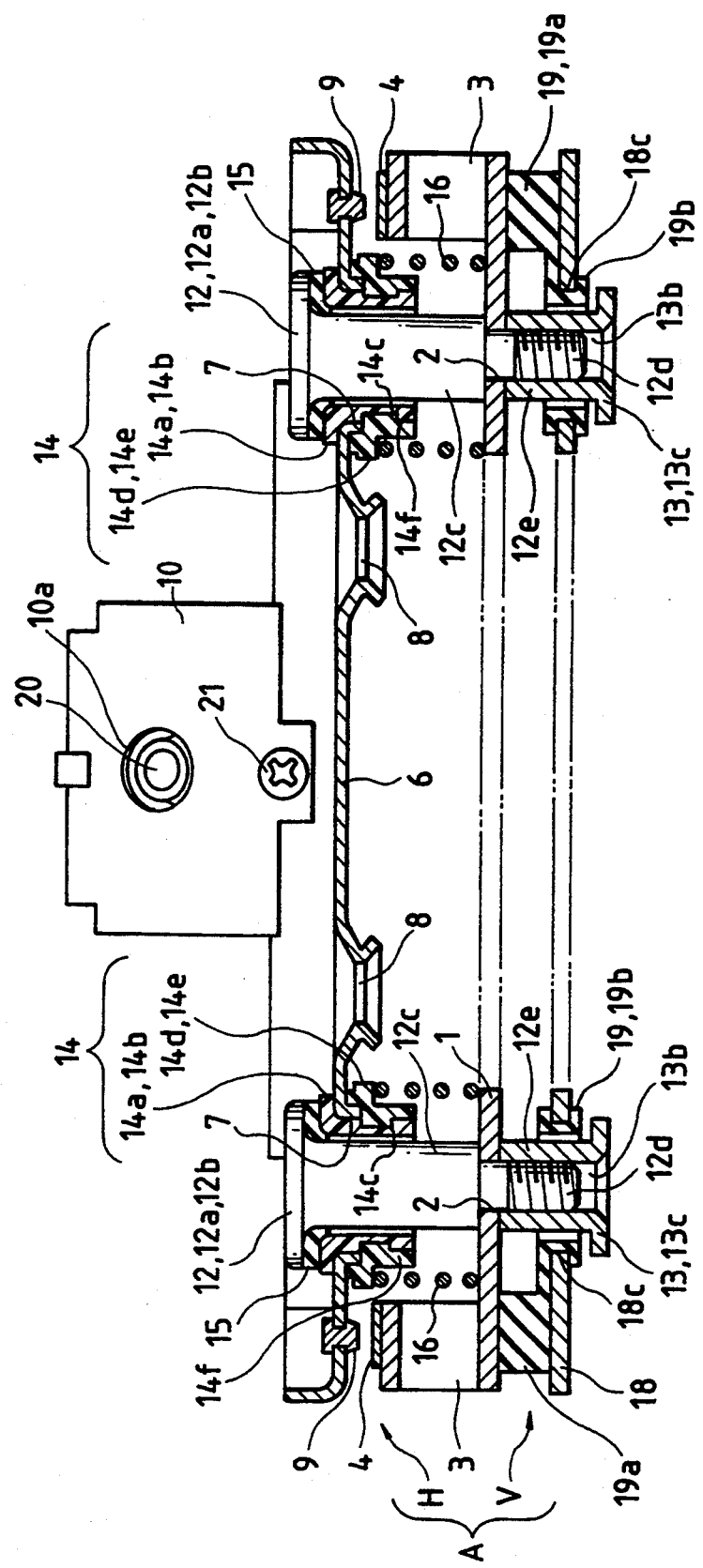
FIG. 6 is a sectional view taken along line VI—VI in FIG. 5.

As shown in FIG. 4, insulating cylindrical spacers 14 and 14 are engaged with the cylindrical walls of the insertion holes 7 and 7 of the second contact plate 6, respectively, thus serving as seats for the coil springs 16 and 16. Each of the spacers 14 comprises a sleeve part 14a and a spring seat part 14d. The sleeve part 14a includes: a flange 14b which abuts against the upper surface of the periphery of the insertion hole 7 of the second contact plate 6; and a locking groove 14c formed in its cylindrical body below the flange 14b. The spring seat part 14d comprises: a flange 14e whose lower surface is a seat for the coil spring 16; and locking pawls 14f provided below the flange 14e which are engaged with the locking groove 14c combining the sleeve part 14a and the spring seat part 14d together.

Each of the guide pins 12 is made up of a flange 12b, a stem 12c extended from the flange 12b, and a male-threaded end portion 12d which extend from the stem 12c and is smaller in diameter than the stem 12c. The guide pins 12 are inserted into the insertion holes 7 of the second contact plate 6 and then into the insertion holes 2 of the first contact plate 1, respectively.

Nuts 13 are threadably engaged with the male-threaded end portions 12d of the guide pins 12. Each of the nuts 13 has a flange 13c at the lower end of its body 13a.

The inside diameter of the sleeve part 14a of each of the spacers 14 is such that the stem 12c of the guide pin 12 is slidable in the sleeve part 14a; that is, the inside diameter is substantially equal to the outside diameter of the stem 12c. The inside diameter of each of the insertion holes 2 of the first contact plate 1 is smaller than the outside diameter of the stem 12c, permitting the insertion of the male-threaded end portion 12d only. The outside diameter of the body 13a of each of the nuts 13 is slightly smaller than the inside diameter of insertion holes 18c which are formed in a mounting plate 18 and covered with cover portions 19b of vibration proofing rubber members 19, the function of which will become apparent below.

In other words, in each of the guide pins 12, the outside diameter of the flange 12b is substantially equal to the outside diameter of the flange 14b of the spacer 14, and larger than the inside diameter of the insertion hole 7 of the second contact plate 6. The outside diameter of the stem 12c is such that the stem 12c is slidable in the sleeve part 14a of the spacer 14. Furthermore, the outside diameter of the stem 12c is substantially equal to the inside diameter of the sleeve part, and larger than the inside diameter of the insertion hole 2 of the first contact plate 1. The outside diameter of each of the male-threaded end portions 12d is such that it can be inserted into the insertion hole 2 of the first contact plate 1. In each of the nuts 13, the outside diameter of its body 13a is slightly smaller than the insertion holes 18c of the mounting plate 18 which are covered with the cover portions 19b, and the outside diameter of the flange 13c is larger than the inside diameter of the insertion holes 18c.

In the above-described embodiment, the guide pins 12 are fixedly secured to the first contact plate 1 by engaging the nuts 13 with the male-threaded end portions 12c of the guide pins 12.

Further, in FIG. 4, reference numeral 15 designates cushion members, each of which is adapted to prevent the interference of the flange 12b of the guide pin 12 with the flange 14b of the spacer 14, thereby preventing noise.

The vibration prevention mechanism V includes the mounting plate 18 and two vibration proofing rubber members 19.

The mounting plate 18 is a metal plate. More specifically, as shown in FIG. 2, the mounting plate 18 is substantially shallow-U-shaped having two bent portions at both ends, from which tongue pieces 18a are extended. The tongue pieces 18a have mounting holes 18b, which are used to secure the mounting piece 18 to the core bars 30 of the spoke sections S of the steering wheel W. The mounting plate 18 has insertion holes 18c near both ends, into which the guide pins 12 are inserted.

The aforementioned vibration proofing rubber members 19 are made of natural rubber, and are provided between the mounting plate 18 and the first contact plate 1 immediately below the contacts 4 of the first contact plate 1. More specifically, the vibration proofing rubber members 19 are bonded to the mounting plate 18 and the first contact plate 1 by vulcanizing. Each of the vibration proofing rubber members 19 comprises its body 19a, and the aforementioned cover portion 19b.

As shown in FIG. 4, the horn switch mechanism H and the vibration prevention mechanism V are combined as follows: The guide pins 12 are inserted into the insertion holes 7 and 2 of the second and first contact plates 6 and 1, and the nuts 13 are engaged with the male-threaded end portions 12c of the guide pins 12 from below the insertion holes 18c of the mounting plate 18. That is, the flanges 12b of the guide pins 12 are abutted against the peripheries of the insertion holes 7 of the second contact plate 6 through the flanges 14b of the spacer 14, respectively; while the flanges 13c of the nuts 13 are abutted against the peripheries of the insertion holes 18c of the mounting plate 18 which have been covered with the cover portions 19b of the vibration proofing rubber members 19, respectively, so that the horn switch mechanism H is prevented from coming off the vibration prevention mechanism V. Thus, the horn switch mechanism H has been combined with the vibration prevention mechanism V.

In the embodiment, the guide pins 12 are fixedly secured to the first contact plate 1 by threadedly engaging the nuts 13 with the male-threaded end portions of the guide pins 12.

The horn switch mechanism H and the vibration prevention mechanism V combined as described above (as indicated at A in FIG. 1) are mounted on the core bars 31 by inserting bolts 31 into the mounting holes 18b of the mounting plate 18. Thus, the horn switch mechanism H and the vibration prevention mechanism V have been mounted on the steering wheel W.

The first contact plate 1 is connected through a lead wire (not shown) to the mounting plate 18. Therefore, when the mounting plate 18 is brought into contact with the core bar 30, it is electrically connected to the negative electrode of a horn operating circuit. The second contact plate 6 is electrically connected through a lead wire (not shown) to the positive electrode of the horn operating circuit.

In the embodiment, after the installation of the horn switch mechanism H and the vibration prevention mechanism V, the air bag device M is installed as follows: The air bag device M is temporarily secured to the horn switch mechanism H by locking the locking legs 26 to the locking holes 8 of the second contact plate 6. Thereafter, the bolts 20 are engaged with the nuts 27 of the air bag device M.

Now, with reference to FIG. 3, the air bag device M itself will be described in brief. The air bag device M includes an air bag 22 which is inflated when required; a pad 23 surrounding the folded air bag 22; an inflator for supplying a predetermined gas to inflate the air bag 22; and a bag holder 25 holding the air bag, the pad 23, and the inflator 24. The bag holder 25 has the aforementioned locking legs 26 and nuts 27.

With the steering wheel designed as described above, the horn is operated as follows: The pad 23 of the air bag device M is pushed down; that is, the second contact plate 6 together with the air bag device M is moved towards the first contact plate 1. In this operation, the second contact plate 6, guided by the guide pins 12, and the contacts 9 of the second contact plate 6 are brought into contact with the contacts 4 of the first contact plate, so that the horn is operated.

The pad 23 may be further pushed downwardly to move the second contact plate 6 towards the first contact plate. However, in this case, while the bodies 19a of the vibration proofing rubber members 19 held between the first contact plate 1 and the mounting plate 18 are being elastically deformed, the second contact plate 6 is moved together with the first contact plate 1, which will prevent the pushing motion from being stopped abruptly.

The bodies 19a of the vibration proofing rubber members 19 are provided immediately below the contacts 4 of the first contact plate 1, and the contacts 4 and 9 of the first and second contact plates 1 and 6, and the two vibration proofing rubber members 19 are on one and the same plane (taken along line II—II in FIG. 1). Hence, when the contacts 9 of the second contact plate 6 are brought into contact with the contacts 4 of the first contact plate 1 by pushing the second contact plate 6 against the first contact plate 1, the bodies 19a of the vibration proofing rubber members 19 are deformed in the direction of movement of the second contact plate 6. This feature prevents the rolling of the second contact plate 6 in the directions of the arrows C in FIG. 4, and allows the contacts 9 and 4 of the second and first contact plates 6 and 1 to be brought in plane contact with each other. That is, the contacts 9 of the second contact plate 6 are stably held in contact with the contacts 4 of the first contact plate 1. This means that the horn is stable in operation.

The cylindrical walls of the insertion holes 18c of the mounting plate 18, into which the guide pins 12 are inserted, are covered with the cover portions 19b of the vibration proofing rubber members 19, which eliminates the difficulty that, when the horn is operated, the guide pins 12 interfere with the cylindrical walls of the insertion holes 18c of the mounting plate 18 which produces noise.

Each of the guide pins 12 has flanges 12b and 12g near both ends, to regulate the space between the second contact plate 6 and the mounting plate 18. That is, the flange 12b is abutted, through the sleeve 14a of the spacer 14, against the upper surface of the second contact plate 6 around the insertion hole 7, while the other flange 12g is abutted, through the cover portion 19b, against the lower surface of the mounting plate 18 around the insertion hole 18c. This structure has the following effects or merits: Even when the bodies 19a of the vibration proofing rubber members 19 are broken, the first contact plate 1 of the horn switch mechanism H is not separated from the mounting plate 18. In addition, in the case where the air bag device M, on which great force acts when activated, is coupled to the second contact plate of the horn switch mechanism H and the mounting plate 18 of the vibration prevention mechanism V, those mechanisms H and V can be arranged suitably.

In the above-described embodiment, the mounting plate 18 is secured to the core bars 30 of the steering wheel W; however, the invention is not limited thereto or thereby. For instance, the horn switch mechanism H and the vibration prevention mechanism V may be set upside down. That is, the steering wheel may be so modified that the mounting plate 18 is coupled to the air bag device M, and the second contact plate 6 is secured to the core bars 30. In this case, in operation of the horn, the first contact plate 1 is movable, and the second contact plate 6 is fixed; that is, the first contact plate 1 is moved towards the second contact plate 6.

Furthermore, in the above-described embodiment, the nuts 13 are engaged with the male-threaded end portions 12d of the guide pins 12 to fixedly secure the pins 12 to the first contact plate 1; however, the invention is not limited thereto or thereby. For instance, the diameter of the insertions holes 2 of the first contact plate 1 may be increased to be substantially equal to that of the male-threaded end portions 12 or the nuts 13 so that the guide pins 12 are secured to the second contact plate 6 or the core bars 30. In this case, under the condition that the horn is not in operation, the distance between the mounting plate 18 and the second contact plate 6 is regulated through the balance between the elastic force of the coil springs 16 and the forces of compression of the bodies 19a of the vibration proofing rubber members 19. In this embodiment, the guide pins 12 are fixedly secured to the first contact plate 1, and the flanges 12b of the guide pins 12 regulate the distance of the second contact plate 6 from the first contact plate 1, and therefore, the distance between the contacts 4 and 9 of the first and second contact plates 1 and 6 can be set constant.

In the above-described embodiment, the bodies 19a of the vibration proofing rubber members 19 are provided immediately below the contacts 4 of the first contact plate 1. However, as long as the two contacts 4 of the first contact plate 1, the two contacts 9 of the second contact plate 6, and the bodies 19a of the two vibration proofing rubber members 19 are in one and the same plane as defined by line II—II in FIG. 1, the contacts 9 and 4 of the second and first contact plates 6 and 1 are brought into contact with each other. On the basis of this fact, the steering wheel may be modified as shown in FIGS. 7 and 8.

Figure 7:
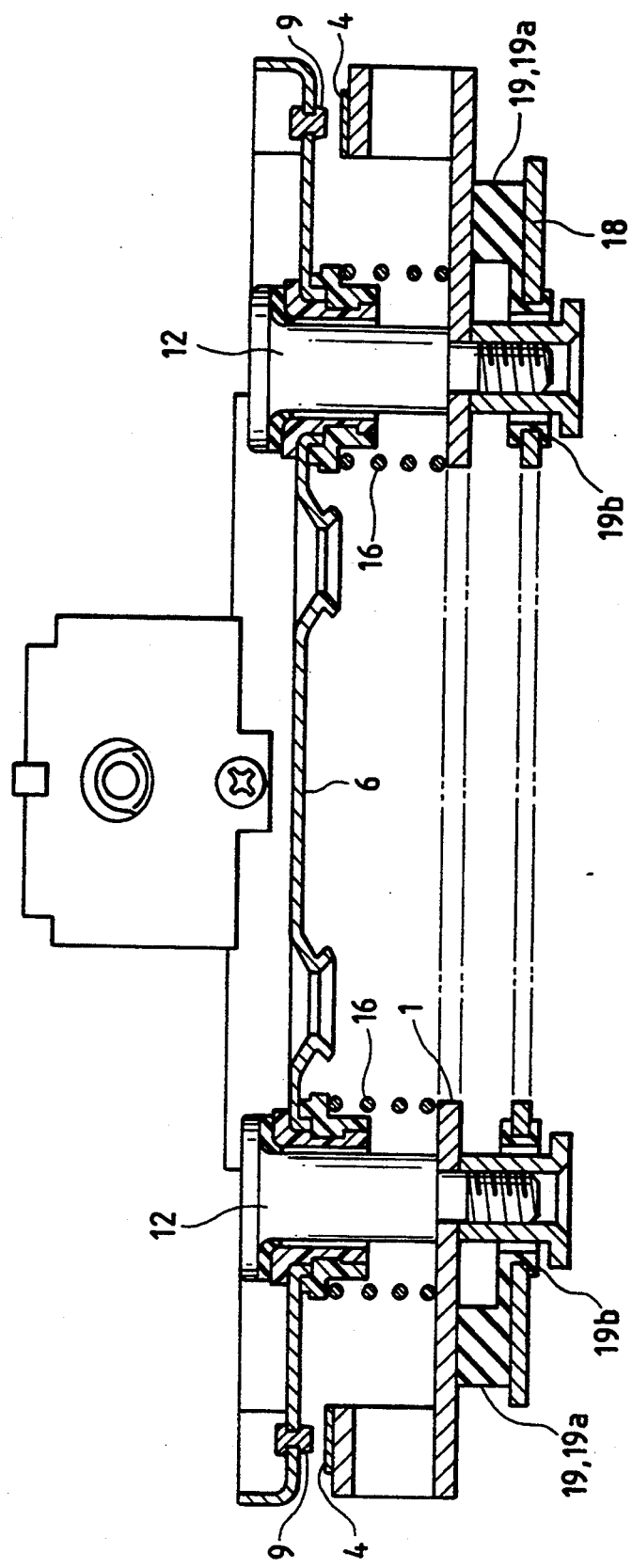

In the steering wheel as shown in FIG. 7, the bodies 19a of two vibration proofing rubber members 19 are disposed between the first pair of contacts 4 and 9 of the first and second contact plates 1 and 6 and the second pair of contacts 4 and 9. Alternatively, the rubber member bodies 19a may be so provided that the first and second pairs of contacts 4 and 9 are located between those bodies 19a.

In the steering wheel as shown in FIG. 8, the bodies 19a of the vibration proofing rubber members 19 are cylindrical, and engaged with the cylindrical walls of the insertion holes 18c of the mounting plate 18.

In the steering wheel according to the invention, the two contacts of the first contact plate, the two contacts of the second contact plate, and the two vibration proofing rubber members are in one and the same plane. Hence, when the two contact plates are moved towards each other to cause their contacts to contact with each other, the vibration proofing rubber members are deformed in the direction of movement of the contact plates. Therefore, the contacts of the contact plates are brought into plane contact with each other, whereby the horn is operated with high stability.

Thus, in the steering wheel having the horn switch mechanism and the vibration prevention mechanism, the latter is effectively utilized to improve the operability of the horn; i.e., to allow the operator to operate the horn smoothly.

Further, in the steering wheel of the invention, the cylindrical walls of the insertion holes formed in the mounting plate, in which the guide pins are inserted, are covered with the cover portions of the vibration proofing rubber members. This feature eliminates the difficulty that, when the horn is operated, the guide pins interfere with the cylindrical walls of the insertion holes of the mounting plate to produce noise.

Each of the guide pins has a flange at each end to regulate the distance between the second contact plate and the mounting plate. This structure has the following effects or merits: Even when the bodies of the vibration proofing rubber members are broken, the first contact plate of the horn switch mechanism is not separated from the mounting plate. In addition, in the case where the air bag device on which great force acts when activated is coupled to the second contact plate of the horn switch mechanism and the mounting plate of the vibration prevention mechanism V, those mechanisms can be arranged suitably.

In summary, in the steering wheel having the horn switch mechanism and the vibration prevention mechanism according to the invention, the vibration prevention mechanism is effectively utilized to allow the operator to operate the horn smoothly. Furthermore, the guide pins do not interfere with the mounting plate to produce noise. The air bag device, on which great force acts when activated, can be secured to the horn switch mechanism and the vibration prevention mechanism. Further, even when the bodies of the vibration prevention rubber members are broken, the air bag device is protected from damage.

While the invention has been described in connection with the preferred embodiment, it will be evident to those skilled in the art that various changes and modifications may be made therein without departing from the invention, and it is aimed, therefore, to cover in the appended claims all such changes and modifications as fall within the true spirit and scope of the invention.

What is claimed is:

1. A steering wheel comprising:
a steering wheel body including a ring section, a boss section, and spoke sections coupling said ring section to said boss section;
a horn pad disposed over said boss section; and
a horn switch mechanism disposed between said steering wheel body and said horn pad;
said horn switch mechanism comprising:
a first contact plate including electrical contacts;
a second contact plate secured to one of said steering wheel body and said horn pad, said second contact plate including electrical contacts which are adapted to be brought into contact with said electrical contacts of said first contact plate;
a mounting plate having insertion holes defined therein, said mounting plate being secured to the other one of said steering wheel body and said horn pad;
vibration proofing rubber members coupling said mounting plate to said first contact plate;
elastic members constructed and arranged to space said first and second contact plates away from each other; and
guides constructed and arranged to guide movement of at least one of said first and second contact plates, said guides being loosely inserted into said insertion holes of said mounting plate, each of said guides having a flange at each end thereof for regulating a distance between said second contact plate and said mounting plate.

2. A steering wheel as claimed in claim 1, further comprising an air bag module cooperating with said horn pad.

3. A steering wheel as claimed in claim 2, further comprising cushion members covering cylindrical walls of said insertion holes.

4. A steering wheel as claimed in claim 3, wherein said cushion members are integral with said vibration proofing rubber members.

5. A steering wheel as claimed in claim 2, wherein each of said guides has a shaft through which said flanges are coupled to each other,
one of said first and second contact plates having through-holes and being guided by said shafts inserted into said through-holes, and
the other of said first and second contact plates being fixedly secured to said guides.

6. A steering wheel as claimed in claim 5, wherein each of said guides comprises:
a first guide member having a male-threaded portion at one end thereof, said flange being disposed opposite said one end, and
a second guide member having a female-threaded portion at one end thereof which is engageable with said male-threaded portion, said flange being disposed opposite said one end of said female-threaded portion, and
said other of said first and second contact plates being fixedly held between said first and second guide members.

7. A steering wheel as claimed in claim 5, wherein said elastic members are coil springs disposed about said shafts.

8. A steering wheel comprising:
a steering wheel body including a ring section, a boss section, and spoke sections coupling said ring section to said boss section;
a horn pad disposed over said boss section; and
a horn switch mechanism disposed between said steering wheel body and said horn pad;
said horn switch mechanism comprising:
a first contact plate including a plurality of first electrical contacts;
a second contact plate secured to one of said steering wheel body and said horn pad, said second contact plate including a plurality of second electrical contacts which are brought into contact with said first electrical contacts of said first contact plate;
a mounting plate secured to the other one of said steering wheel body and said horn pad;
a plurality of vibration proofing rubber members coupling said mounting plate to said first contact plate; and
elastic members constructed and arranged to space said first and second contact plates away from each other;

said plurality of first electrical contacts, said plurality of second electrical contacts, and said plurality of vibration proofing rubber members being disposed on a common plane.

9. A steering wheel as claimed in claim 8, further comprising an air bag module cooperating with said horn pad.

10. A steering wheel as claimed in claim 9, wherein said plurality of first electrical contacts are a pair of first electrical contacts, and said plurality of second electrical contacts are a pair of second electrical contact, said pair of first and second electrical contacts being disposed on said common plane.

11. A steering wheel as claimed in claim 10, wherein said first electrical contacts, said second electrical contacts, and said vibration proofing rubber members are disposed on straight lines which are in parallel with each other, in such a manner that each first electrical contact, each second electrical contact, and each vibration proofing rubber member are disposed on each straight line.

12. A steering wheel as claimed in claim 11, wherein said mounting plate includes insertion holes, and
said horn switch mechanism includes guides which are loosely inserted into said insertion holes to guide at least one of said first and second contact plates,
each of said guides having a flange at each end thereof to regulate a distance between said second contact plate and said mounting plate.

13. A steering wheel as claimed in claim 11, wherein said first contact plate has U-shaped portions each having two sides, and
each first contact is provided on one of said two sides, and each vibration proofing rubber member is provided on the other of said two sides.

* * * * *